July 3, 1928.

E. W. KNOWLTON

SANITARY MEAT GRINDER

Filed Feb. 18, 1927

1,675,809

Inventor,
Eugene W. Knowlton,
by Guyer & Guyer
Attorneys.

Patented July 3, 1928.

1,675,809

UNITED STATES PATENT OFFICE.

EUGENE W. KNOWLTON, OF BUFFALO, NEW YORK.

SANITARY MEAT GRINDER.

Application filed February 18, 1927. Serial No. 169,202.

This invention relates more particularly to the type of food grinder comprising a casing containing a feed screw for forcing the substance through a perforated plate at the discharge end of the casing.

One of its objects is to provide the grinder with a safety feed hopper which renders it practically impossible for the operator to reach the screw in attempting to push the meat or other substance to be ground into the casing, thereby guarding against injury.

Another object is the provision of a simple device for delivering the substance under pressure to the feed screw instead of depending on gravity, which is impractical, the device being so constructed and arranged as to avoid the necessity of the operator's touching the substance, thus rendering the feed operation sanitary.

In the accompanying drawings:—

Figure 1:
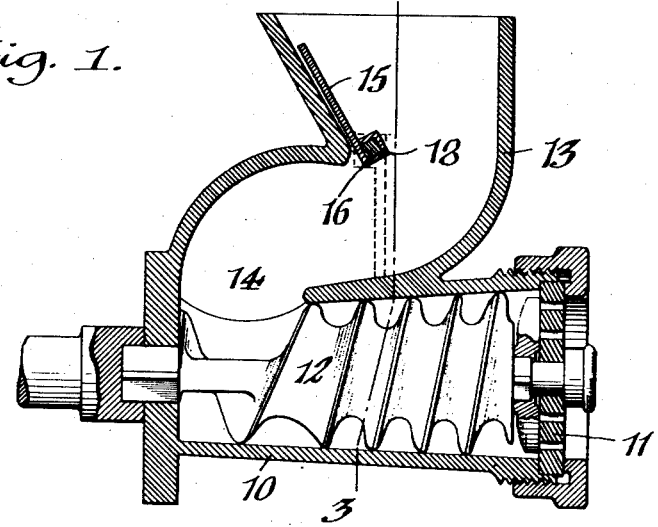
Figure 2:
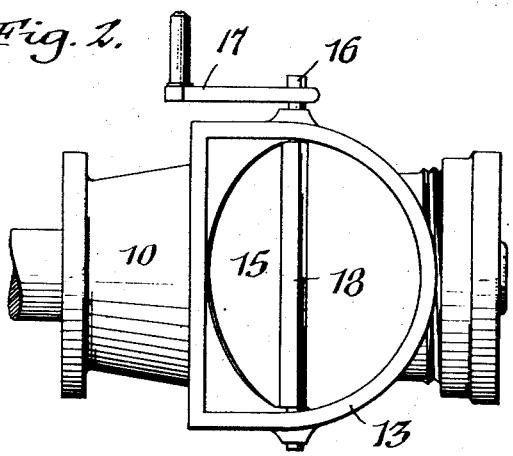
Figure 3:
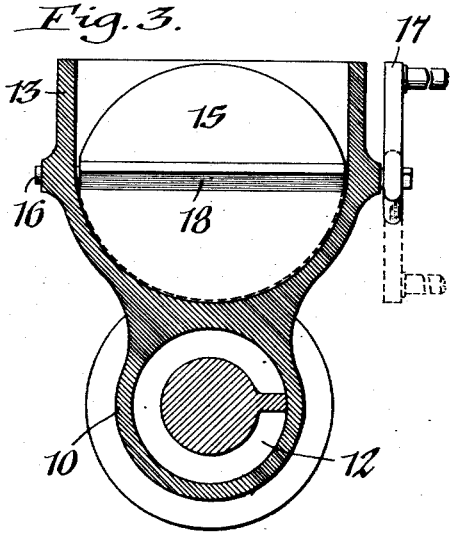
Figure 4:
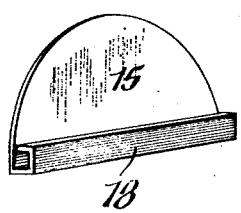
Figure 5:

Figure 1 is a longitudinal section of a substance grinder containing the improvement. Figure 2 is a top plan view thereof. Figure 3 is a cross-section on line 3—3, Fig. 1. Figure 4 is a perspective view of the feed-paddle. Figure 5 is a similar view of the crank shaft.

Similar characters of reference indicate corresponding parts throughout the several views.

The casing or cylinder 10 has the usual perforated plate 11 at its outer end. The feed screw 12 may be of conventional construction and driven by any ordinary means.

13 indicates the feed hopper which leads into the rear portion of the casing 10. As shown, the hopper is preferably arranged over the central portion of the casing and its discharge spout or throat 14 is laterally offset or extended horizontally to the rear end of the casing. This arrangement forms a safety angle at the junction of the hopper and its spout which prevents the operator from thrusting his hand into the hopper far enough to come in contact with the feed screw, thus protecting him from injury.

Arranged in the hopper is a combined hand-guard and pressure member 15. In its preferred construction, this member consists of a vertically-swinging semi-circular blade or paddle secured to a horizontal crank-shaft 16 passing transversely through the hopper at its junction with its angular discharge throat 14 and having a crank 17 outside of the hopper for rocking it. This paddle extends from side to side of the hopper and is of such a length that it may be swung up into the position shown by full lines in Fig. 1 in which it is out of the way and rests against the rear wall of the hopper; or swung down to the dotted position in which it extends across the inlet end of the discharge throat.

In the use of the machine, the hopper is filled with meat or other substance, with the pressure paddle in its upper position, where it is covered by the substance. The paddle is then pulled down by the crank to the dotted-line position shown in Fig. 1, forcing the substance through the throat 14 into the screw chamber, after which the paddle is returned to its normal position, preparatory to forcing the next batch into the screw chamber.

The feeding of the substance into the screw chamber is thus accomplished without the operator's hands coming in contact with the substance to be cut or ground, rendering the machine sanitary.

At the same time, the paddle, when lowered, serves as a safety guard or baffle which makes it practically impossible for the operator to thrust his hand into the casing and become injured.

In the preferred construction shown, the crank of the paddle-shaft is detachable and the body of the shaft is square or of other flat-sided form and removably passed through a hub or socket 18 of the paddle having a corresponding cross section so that while the paddle is compelled to turn with the shaft, the latter may be readily withdrawn from the hopper and the paddle removed for cleaning these parts from time to time. This simple construction dispenses with set screws or other separate fastening devices.

The improvement may obviously be embodied as an integral part of the machine or as an attachment to grinders now in use.

I claim as my invention:—

In a substance grinder, a casing having a perforated plate at one end, a feed-screw in the casing, an upright hopper mounted on the casing and having a horizontally-extending discharge-spout leading into the rear portion of the casing, a vertically-swinging pressure-paddle and hand guard arranged in the hopper and pivoted to the rear wall thereof at its junction with the spout, the paddle in its raised position lying against the rear wall of the hopper and in its lowered position extending across the mouth of the spout.

EUGENE W. KNOWLTON.